United States Patent [19]

Seibel

[11] Patent Number: 5,098,308

[45] Date of Patent: Mar. 24, 1992

[54] AIR SPRING HAVING AN ARRANGEMENT FOR CONNECTING LINES

[75] Inventor: Maximilian Seibel, Sindelfingen, Fed. Rep. of Germany

[73] Assignee: Dr. Ing. h.c.F. Porsche AG, Fed. Rep. of Germany

[21] Appl. No.: 409,795

[22] Filed: Sep. 20, 1989

[30] Foreign Application Priority Data

Sep. 20, 1988 [DE] Fed. Rep. of Germany ....... 3831859

[51] Int. Cl.⁵ ............................................ H01R 4/60
[52] U.S. Cl. ..................................... 439/192; 439/271
[58] Field of Search ............... 267/64.16, 64.17, 64.28; 439/191, 192, 194, 195, 198, 190, 271, 559, 548

[56] References Cited

U.S. PATENT DOCUMENTS

| | | |
|---|---|---|
| 2,137,162 | 11/1938 | Hile . |
| 2,307,393 | 1/1943 | Crowley ........................ 439/191 X |
| 2,776,385 | 1/1957 | Modrey . |
| 3,001,784 | 9/1961 | Polhemus . |
| 3,210,715 | 10/1965 | Mitchell et al. ..................... 439/191 |
| 3,747,048 | 7/1973 | Johnson et al. ..................... 439/276 |
| 3,777,298 | 12/1973 | Newman . |
| 4,609,239 | 9/1986 | Abel et al. ........................... 439/194 |
| 4,886,466 | 12/1989 | Doherty et al. ..................... 439/191 |

FOREIGN PATENT DOCUMENTS

| | | |
|---|---|---|
| 0817356 | 11/1974 | Belgium . |
| 1929799 | 9/1970 | Fed. Rep. of Germany ...... 439/192 |
| 3112078 | 10/1982 | Fed. Rep. of Germany . |
| 3609405 | 9/1987 | Fed. Rep. of Germany . |
| 2576661 | 8/1986 | France .............................. 267/64.28 |
| 830326 | 3/1960 | United Kingdom ............. 267/64.16 |
| 1392718 | 4/1975 | United Kingdom ................. 439/190 |

*Primary Examiner*—Robert J. Oberleitner
*Attorney, Agent, or Firm*—Evenson, Wands, Edwards, Lenahan & McKeown

[57] ABSTRACT

An air spring is described which has an arrangement for the releasable connecting of lines for an electrically controlled level controlling system of a motor vehicle. The arrangement consists essentially of a connecting element comprising a one-part housing, this connecting element having connections for the air pipes and the electric lines. The connections are closed off toward the outside by means of sealing rings. The connection of the housing and the air spring takes place by means of a holding plate arranged on the inside of a sleeve of the air spring.

16 Claims, 3 Drawing Sheets

AIR SPRING HAVING AN ARRANGEMENT FOR CONNECTING LINES

BACKGROUND AND SUMMARY OF THE INVENTION

The invention relates to an air spring having an arrangement for the releasable connecting of lines for an electrically controlled level control system of a motor vehicle.

From DE-PS 31 12 078, a plug-type connection is known in which an electric and an optical conductor is arranged in each plug, the conductors being connectable with conductors of an additional plug. Plug-type connections of this type permit the arrangement of different conductors in one plug element as well as their connecting.

An object of the invention is to provide an arrangement at an air spring for connecting lines which consists of a component which is easy to manufacture and ensures a precise connection of the two lines which are led in from the outside.

According to the invention, this object is achieved by providing an arrangement wherein a connecting element is provided with integrated connections (L and E) consisting of a one-part housing for at least one air pipe and electric lines, the connections of which air pipes and electric lines (L and E) are closed off toward the outside, by means of sealing rings, and wherein the housing is fixable at the air spring by means of a holding plate The principal advantages achieved by means of the invention are that the arrangement for receiving the lines consists of a stationary connecting element which comprises a housing and which securely houses all feed lines required for an air spring of a motor vehicle. These feed lines are equipped with connecting elements, such as plugs and threaded sleeves, and, in a simple manner, may be pulled off receiving devices in the housing which is absolutely necessary for the purpose of carrying out repairs and other purposes. In especially preferred embodiments, the housing consists essentially of a compact cast part and, by means of a counterplate, is airtightly fixed at a sleeve of the air spring by way of corresponding sealing rings. As a result of a housing of this type with integrated connections, expensive individual plug connections are not required, which are relatively expensive to test and to mount and in the operation do not always ensure reliable contacting. In addition, the expenditures for the parts and the mounting, in the case of several plug connections, is higher than in the case of a connection in a stationary housing. For securing the hold of the electrical connection at the housing, a securing cap is pivotally connected.

Preferably, the housing according to the invention consists of plastic material.

Other objects, advantages and novel features of the present invention will become apparent from the following detailed description of the invention when considered in conjunction with the accompanying drawings.

DETAILED DESCRIPTION OF THE DRAWINGS

Figure 1:
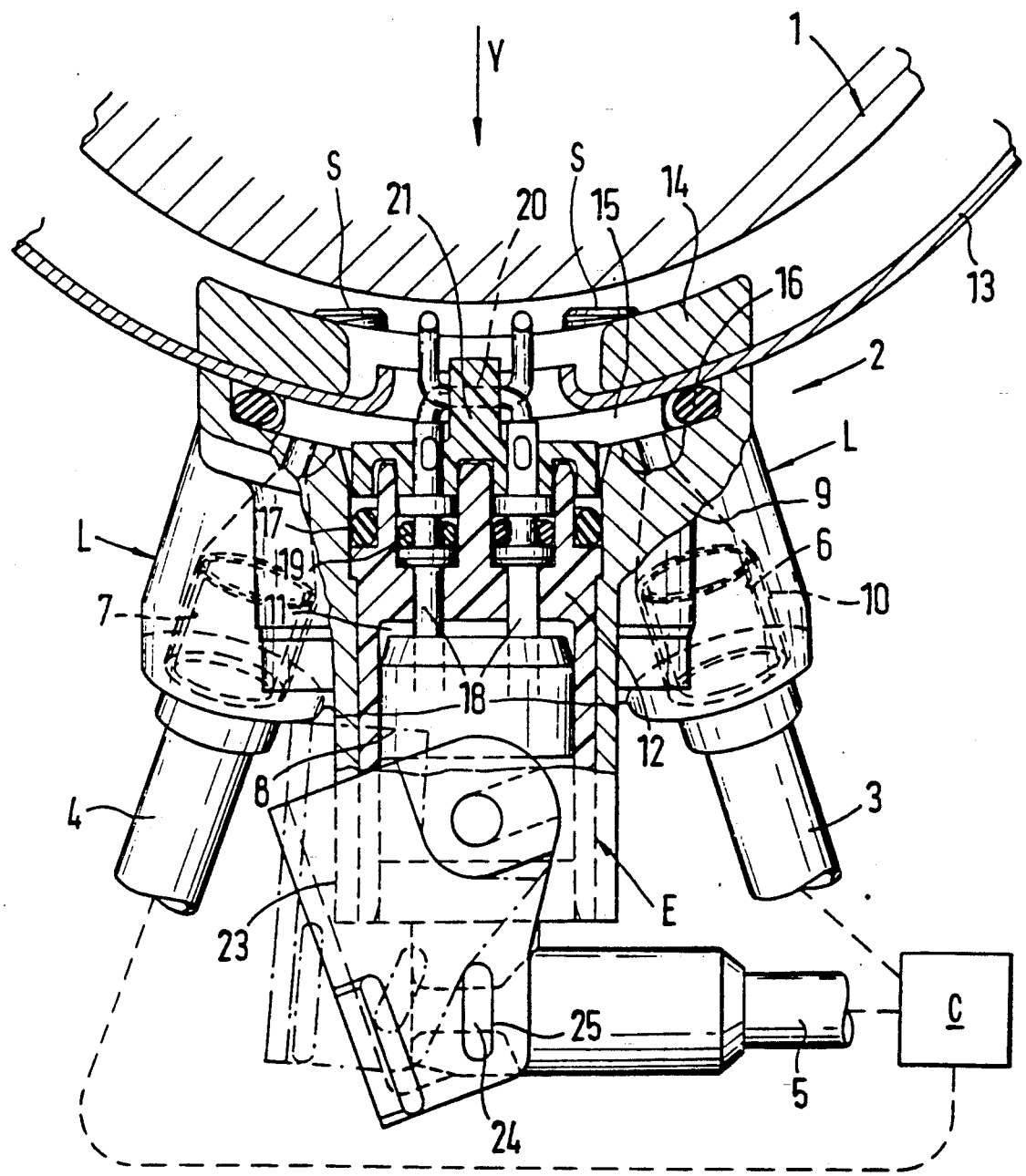
FIG. 1 is a sectional lateral schematic view of a connecting element which is joined to an air spring and comprises a housing, constructed according to a preferred embodiment of the invention.
Figure 2:
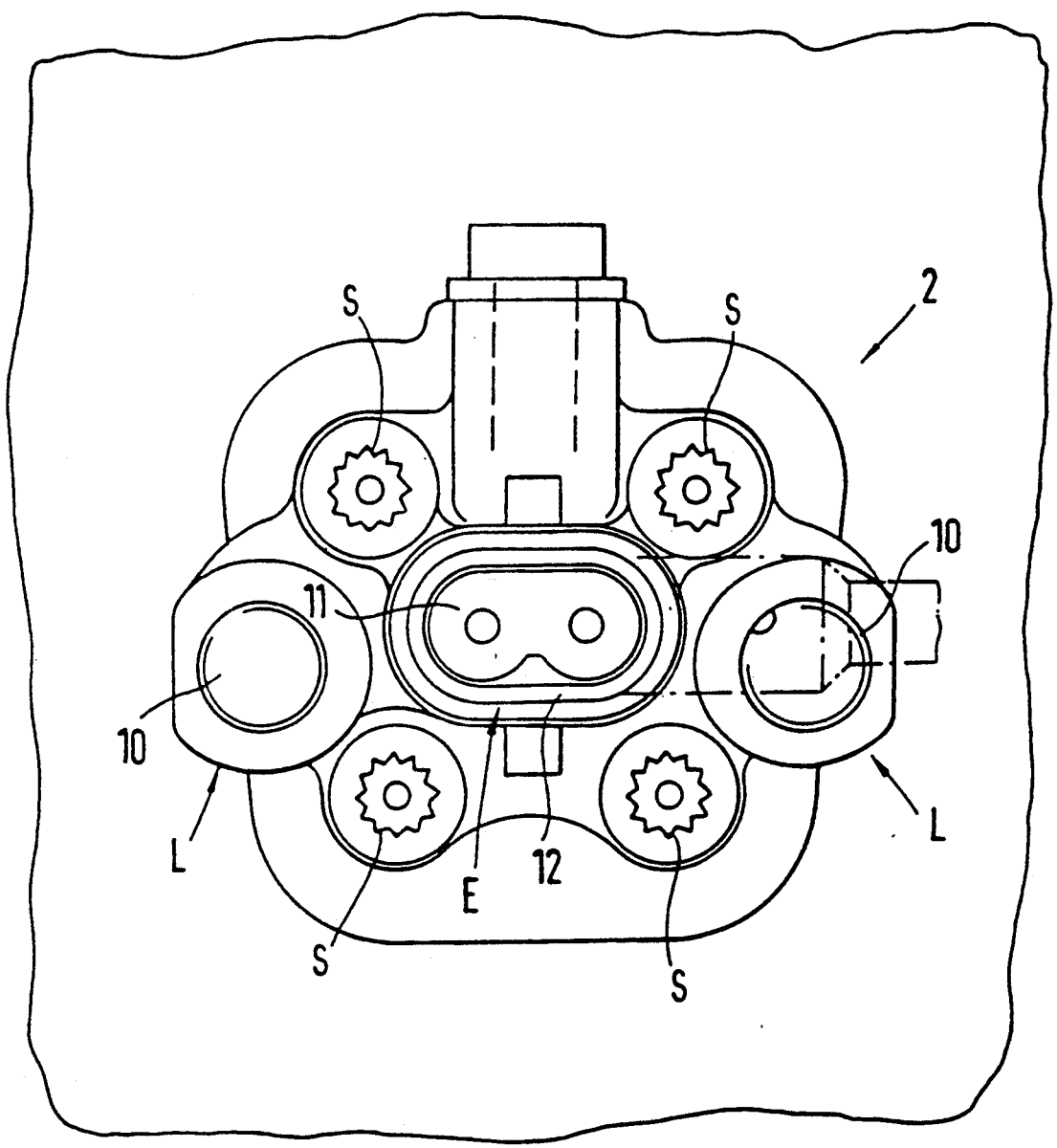
FIG. 2 is a view of the housing of FIG. 1 taken in the direction of the arrow Z.
Figure 3:
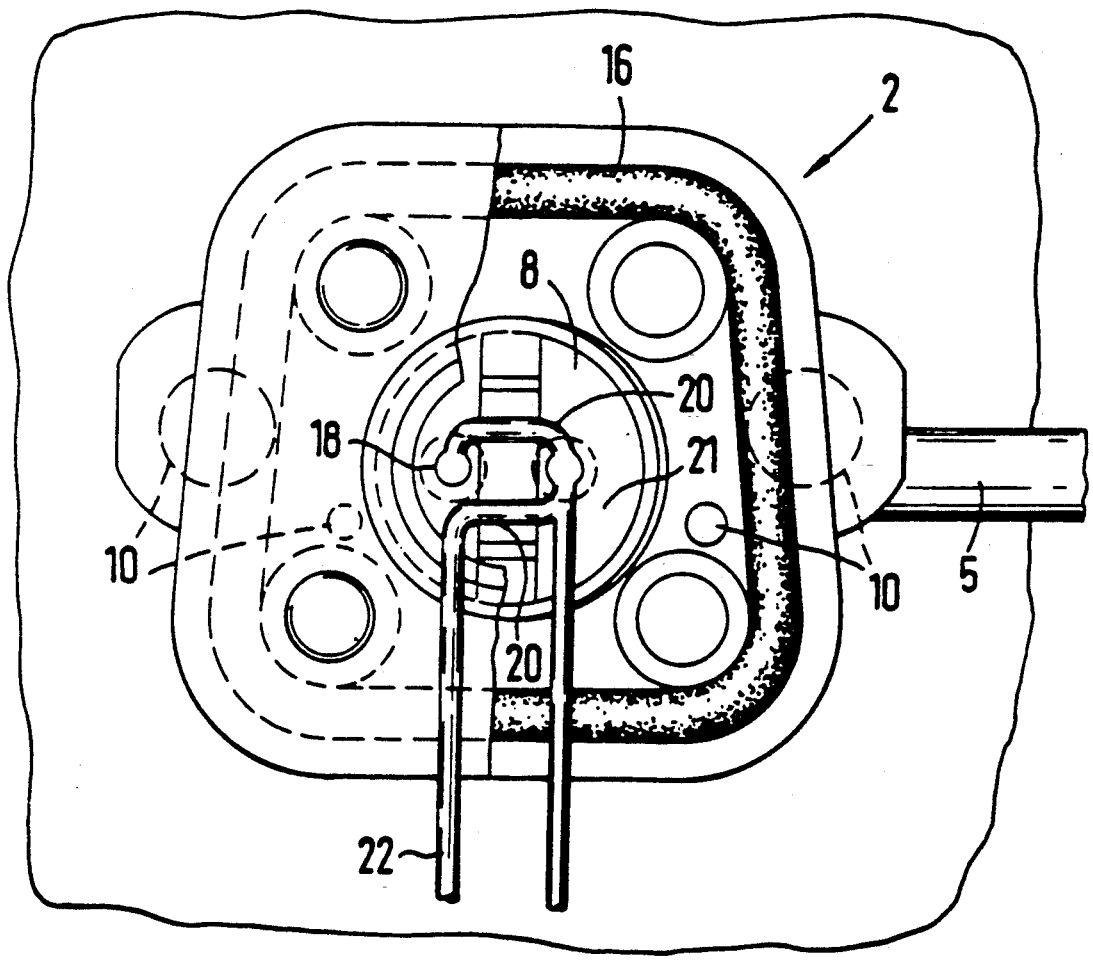
FIG. 3 is a view of the housing of FIG. 1 taken in the direction of the arrow Y.

The air spring 1 for a level control system of a motor vehicle has a common connecting element 2 consisting of a housing 9 for two air pipes 3 and 4 (pipes 3 and 4 indicated generally by "L" in the FIG. 2 illustration) and for an electric feed line 5. FIG. 1 schematically depicts the extension of the air lines 3 and 4 and the electric feed line 5 to a control unit valve system C, whereby the electric signal is used to control of valves for supplying air to the air lines or pipes 3, 4. These lines 3, 4 and 5 are each equipped with connecting elements 6, 7 and 8, which, in the case of the air pipes 3 and 4, consist of screw-in sleeves 6 and 7 and, in the case of the electric line 5, consist of a plug 8. Behind these connecting elements, the housing 9 has corresponding threaded bores 10 for the screw-in sleeves 6 and 7 and an axial passage opening 11 for receiving an insert part 12 for the plug 8.

The housing 9 is constructed in one piece and, by means of screws, is tightened against a plate 14 which, on the interior sides "S", is arranged at the sleeve 13 of the air spring 1 and in this manner is held at the sleeve 13.

As shown in detail in FIG. 2, the passage opening 11 for the electric connection E is arranged approximately in the center of the housing 9, whereas the threaded bores 10 for the air pipes 3 and 4 are arranged adjacent to it on both sides of this passage opening 11 and opposite the housing 9.

The connections for the air pipes 3 and 4 are each provided at both sides permitting a use for the wheels of each vehicle side. For this purpose, one bore always extends through the housing, whereas the other bore is closed.

The threaded bores 10, with a smaller diameter, lead into an air collecting space 15 at the foot of the housing 9, this air collecting space 15 being closed off toward the outside by means of a sealing ring 16 resting against the sleeve 13. Another sealing ring 17 is provided on the insert part 12 for the electric plug 8. Also, in order to prevent a loss of pressure, the electric contact pins 18 are surrounded by sealing rings 19.

The insert part 12 of the plug 8, at the end on the output side, is provided with a cable relief element 21 which has a bore 20 extending transversely with respect to the contact pin 18, one cable 22 respectively of the electric line 5 being guided at this bore 20 in the manner of a labyrinth.

At the housing 2, the electric plug 8 is held in its inserted position by means of a pivotable securing cap 23. For this purpose, lugs 24 are molded onto the plug 8 which, in the locked state, engage in slots 25 of the cap 23.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for releasable connection of lines for an electrically controlled pneumatic level control system, comprising:
   a one-part housing with integrated air and electric line connections,
   sealing ring means for closing of the connections toward the outside, and holding plate means for fixing the housing at an air spring,
   wherein the electric connection includes an insert part arranged in a passage opening of the housing and a cable relief element-fitted on the insert part, said cable relief element having transversely arranged notches into which electric line means are clamped, which electric line means are guided to the air spring and are connected with contact pins protruding through the insert part, said cable relief element being detachably arranged in the passage opening of the insert part to accommodate repairs and the like.

2. An arrangement according to claim 1, wherein the electric line connection is arranged in the center of the housing, and wherein two air connections are provided opposite one another in the housing at respective sides of this electric line connection, each of said air connections comprising one passage bore.

3. An arrangement according to claim 2, wherein the air connections lead into an air collecting space of an air spring which is closed off with respect to the electric line connections on the one side by means of a first sealing ring of the sealing ring means and is closed off on the other side by means of a second sealing ring of the sealing ring means and which supports itself sealingly at a sleeve of the air spring.

4. An arrangement according to claim 3, wherein a safety cap for the electric line means is pivotably connected at a side of the housing facing away from the holding plate means, said safety cap extending over a plug of the electric line means and having slot-shaped recesses interengageable with lugs arranged at the plug.

5. An arrangement according to claim 4, wherein the housing and the insert part are combined into one component which consist of plastic material.

6. An arrangement according to claim 3, wherein the housing and the insert part are combined into one component which consist of plastic material.

7. An arrangement according to claim 2, wherein a safety cap for the electric line means is pivotably connected at a side of the housing facing away from the holding plate means, said safety cap extending over a plug of the electric line means and having slot-shaped recesses interengageable with lugs arranged at the plug.

8. An arrangement according to claim 2, wherein the housing and the insert part are combined into one component which consist of plastic material.

9. An arrangement according to claim 1, wherein a safety cap for the electric line means is pivotably connected at a side of the housing facing away from the holding plate means, said safety cap extending over a plug of the electric line means and having slot-shaped recesses interengageable with lugs arranged at the plug.

10. An arrangement according to claim 9, wherein the housing and the insert part are combined into one component which consist of plastic material.

11. An arrangement according to claim 1, wherein the housing and the insert part are combined into one component which consist of plastic material.

12. An arrangement according to claim 1, wherein only one air connection interacts with one air line of another connecting element, and an additional air connection has no open passage bore.

13. An arrangement according to claim 1, wherein a safety cap for the electric line means is movably connected at a side of the housing facing away from the holding plate means.

14. An arrangement for releasable connection of lines for an electrically controlled pneumatic level control system, comprising:
   a one-part housing with integrated air and electric line connections,
   sealing ring means for closing of the connections toward the outside, and holding plate means for fixing the housing at an air spring,
   wherein the electric connection includes an insert part arranged in a passage opening of the housing and a cable relief element fitted on the insert part, said cable relief element having transversely arranged notches into which electric line means are clamped, which electric line means are connected with contact pins and are guided to the air spring, and
   wherein a safety cap for the electric line means is pivotably connected at a side of the housing facing away from the holding plate means, said safety cap extending over a plug of the electric line means and having slot-shaped recesses interengageable with lugs arranged at the plug.

15. An arrangement according to claim 14, wherein the housing and the insert part are combined into one component which consists of plastic material.

16. An arrangement according to claim 14, wherein the electric line connection is arranged in the center of the housing, and wherein two air connections are provided opposite one another in the housing at respective sides of this electric line connection, each of said air connections comprising one passage bore.

* * * * *